United States Patent
Yokoyama

(10) Patent No.: US 9,145,973 B2
(45) Date of Patent: Sep. 29, 2015

(54) VALVE DEVICE

(71) Applicant: DENSO CORPORATION, Kariya, Aichi-pref. (JP)

(72) Inventor: Shinichi Yokoyama, Gifu (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/158,114

(22) Filed: Jan. 17, 2014

(65) Prior Publication Data

US 2014/0291566 A1    Oct. 2, 2014

(30) Foreign Application Priority Data

Mar. 29, 2013    (JP) .................................... 2013-70753

(51) Int. Cl.
*F16K 25/00*    (2006.01)
*F16K 5/06*    (2006.01)

(52) U.S. Cl.
CPC ............. *F16K 5/0663* (2013.01); *F16K 5/0689* (2013.01)

(58) Field of Classification Search
CPC ...... F16K 5/0663; F16K 5/0689; F16K 25/00
USPC .......................... 251/176, 180, 192, 314, 316
See application file for complete search history.

(56) References Cited

U.S. PATENT DOCUMENTS

| | | | |
|---|---|---|---|
| 2,191,232 A * | 2/1940 | Heinen .......................... | 251/174 |
| 2,929,606 A * | 3/1960 | Kaiser ........................... | 251/174 |
| 3,097,823 A * | 7/1963 | Kaiser ........................... | 251/172 |
| 3,642,248 A * | 2/1972 | Benware ....................... | 251/172 |
| 3,891,183 A * | 6/1975 | Feiring ..................... | 251/315.08 |
| 4,217,923 A * | 8/1980 | Kindersley ............... | 137/315.21 |
| 4,262,688 A * | 4/1981 | Bialkowski ................... | 137/242 |
| 8,201,574 B2 * | 6/2012 | Beasley ..................... | 137/15.22 |
| 8,286,938 B2 * | 10/2012 | Helfer et al. ................. | 251/174 |
| 8,646,752 B2 * | 2/2014 | Beasley ........................ | 251/314 |
| 2013/0087730 A1 | 4/2013 | Seko et al. | |

FOREIGN PATENT DOCUMENTS

| | | |
|---|---|---|
| DE | 102009014047 A1 | 9/2010 |
| JP | S62-000866 U | 1/1987 |
| JP | 2003-083457 A | 3/2003 |
| JP | 2013-092250 A | 5/2013 |

OTHER PUBLICATIONS

OA issued Feb. 10, 2015 in corresponding JP Application No. 2013-070753 (with English translation).

* cited by examiner

*Primary Examiner* — Marina Tietjen
*Assistant Examiner* — Umashankar Venkatesan

(57) ABSTRACT

A rotative member has a first passage and a first surface. A tubular member has a second passage and a concave spherical surface. The second passage is communicable with the first passage according to a rotation angle of the rotative member. The rotative member is rotatable and slidable on the concave spherical surface to form a seal between the rotative member and the tubular member when the concave spherical surface is in pressure contact with the first surface on application of a biasing force. A biasing force application member applies the biasing force to the tubular member. The biasing force application member has a second surface, which is in contact with the tubular member and slidable relative to the tubular member.

15 Claims, 10 Drawing Sheets

AFTER POSITION DEVIATES

VALVE DEVICE

CROSS REFERENCE TO RELATED APPLICATION

This application is based on reference Japanese Patent Application No. 2013-70753 filed on Mar. 29, 2013, the disclosure of which is incorporated herein by reference.

TECHNICAL FIELD

The present disclosure relates to a valve device configured to open and close a passage.

BACKGROUND

For example, Patent Document 1 discloses a conventional valve device including a ball valve and a valve seat. The ball valve has an internal passage therein and rotatable around a predetermined rotation axis thereby to change the direction of the internal passage. The valve seat is substantially in a tubular shape extending in an axial direction, which is different from an axial direction of the rotation axis. The valve seat forms a passage, which is communicated with the internal passage and is blocked from the internal passage. The valve seat has one end in the axial direction, and the one end has an opening surrounded by a concave spherical surface. The ball valve is slidable and rotatable on the spherical surface. The valve seat has the other end in the axial direction, and the other end is equipped with a spring. The spring depresses the valve seat toward the ball valve.

(Patent Document 1)

Publication of an unexamined German patent application No. 10 2009 014 047

A ball valve may be deviated from a predetermined position due to various reasons, such as a variation in a component dimension, deformation caused in the ball valve when applied with a pressure, and/or deformation caused in the shaft to which the ball valve is fixed. Consequently, the ball valve may be displaced in the axial direction of the rotation axis and/or in a direction perpendicular to the axial direction. The displacement in the direction perpendicular to the axial direction may be absorbed to some degree by expansion and contraction of the spring to move the position of the valve seat. It is noted that, the displacement in the axial direction may not be sufficiently absorbed by the spring.

When the displacement of the ball valve arises, the spherical surface of the ball valve may not fit to the concave spherical surface of the valve seat. Consequently, fluid may leak through a gap between the ball valve and the valve seat. In addition, the deviation in the position of the ball valve may cause inclination of the valve seat. Consequently, the spring may apply a biasing force eccentrically to the valve seat. Thus, the spring cannot apply the biasing force uniformly to the periphery of the opening of the passage sufficiently to seal between the valve seat and the ball valve. As a result, fluid may leak through a gap between the ball valve and the valve seat.

SUMMARY

It is an object of the present disclosure to produce a valve device configured to secure a seal performance between a ball valve and a valve seat sufficiently, even when deviation arises in the position of the ball valve.

According to an aspect of the present disclosure, a valve device comprises a rotative member having a first passage and a first surface. The first surface is a part of a convex spherical surface. The rotative member is rotatable around a predetermined rotation axis to change a direction of the first passage. The valve device further comprises a tubular member being a tubular body having an axial direction, which is different from a direction of the rotation axis. The tubular member has a second passage therein. The second passage is configured to be communicated with the first passage of the rotative member and to be blocked from the first passage according to rotation of the rotative member. The valve device further comprises a spherical surface seal structure located at one end side of the tubular member in the axial direction and located around an opening periphery of the second passage of the tubular member. The spherical surface seal structure has a first concave spherical surface, on which the rotative member is rotatable and slidable. The spherical surface seal structure forms a seal between the tubular member and the rotative member when the first concave spherical surface is applied with a biasing force and is in pressure contact with the first surface of the rotative member. The valve device further comprises a biasing force application member configured to apply the biasing force to the tubular member by producing the biasing force itself or by transmitting the biasing force from an other object to the tubular member. The biasing force application member has a second surface, which is in contact with the tubular member from an other end side of the tubular member in the axial direction. The second surface is slidable relative to the tubular member.

According to another aspect of the present disclosure, a valve device comprises a rotative member having a first passage and a first surface. The first surface is a part of a convex spherical surface. The rotative member is rotatable around a predetermined rotation axis to change a direction of the first passage. The valve device further comprises a tubular member being a tubular body having an axial direction, which is different from a direction of the rotation axis. The tubular member has a second passage therein. The second passage is configured to be communicated with the first passage of the rotative member and to be blocked from the first passage according to rotation of the rotative member. The valve device further comprises a spherical surface seal structure located at one end side of the tubular member in the axial direction and located around an opening periphery of the second passage of the tubular member. The spherical surface seal structure has a first concave spherical surface, on which the rotative member is rotatable and slidable. The spherical surface seal structure forms a seal between the tubular member and the rotative member when the first concave spherical surface is applied with a biasing force and is in pressure contact with the first surface of the rotative member. The valve device further comprises a biasing force application member configured to apply the biasing force to the tubular member and configured to be in contact with the tubular member from an other end side of the tubular member in the axial direction. The valve device further comprises a biasing force receiving surface formed as a second concave spherical surface on the other end side of the tubular member in the axial direction. The biasing force receiving surface is configured to receive the biasing force from the biasing force application member.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

Figure 1:
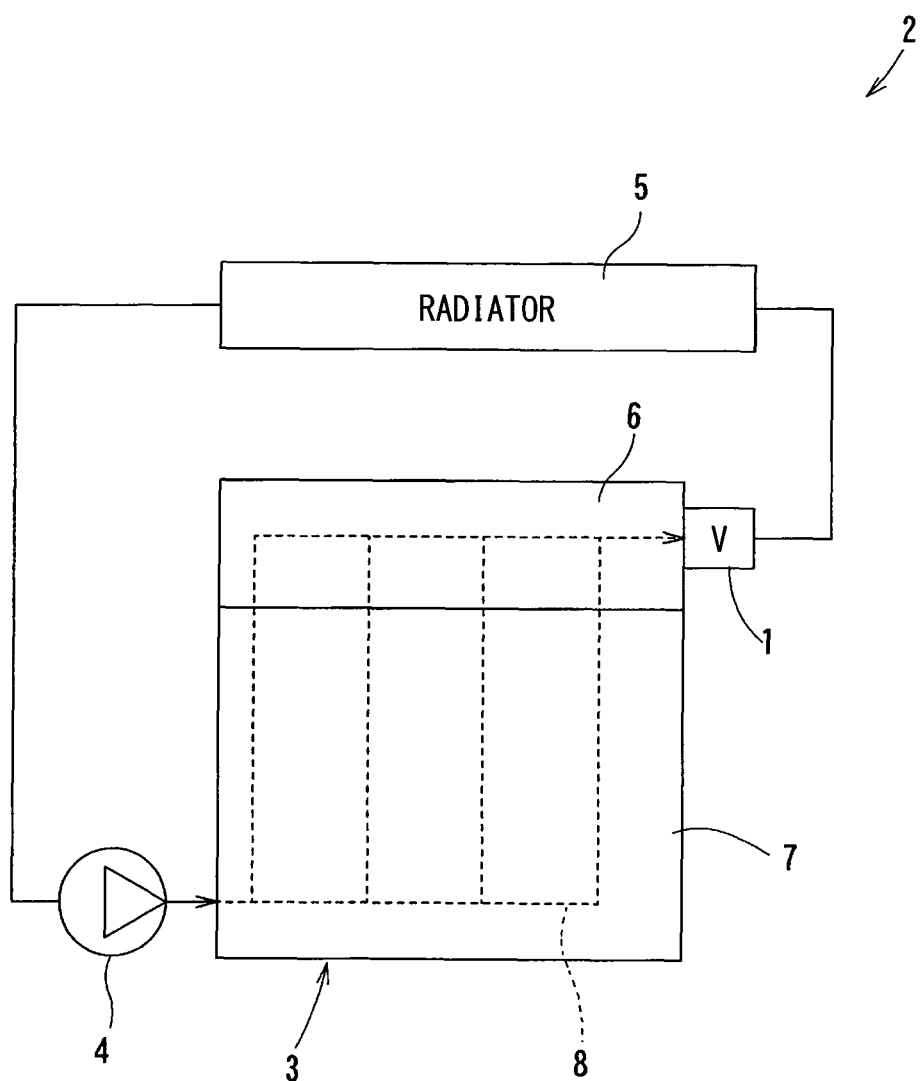
FIG. 1 is a schematic view showing a configuration of an engine cooling apparatus equipped with a valve device according to a first embodiment of the present disclosure.

As follows, embodiments of the present disclosure will be described in detail.

(Embodiment)
(First Embodiment)
(Configuration of First Embodiment)

The present embodiment will be described with reference to FIGS. 1 to 4. First, a configuration of an engine cooling apparatus 2 will be described with reference to FIGS. 1 and 2. The engine cooling apparatus 2 is equipped with a valve device 1 according to the present embodiment. The engine cooling apparatus 2 includes a cooling water circuit. The cooling water circuit forcedly circulates cooling water through an engine 3 thereby to cool the engine 3.

The cooling water circuit is configured to circulate cooling water, which is discharged from a water pump 4, through the engine 3, a radiator 5, and the water pump 4, in this order. The cooling water is a thermal medium such as long life coolant (LLC) including ethylene glycol as a main component.

The engine 3 includes a cylinder head 6 and a cylinder block 7. Each of the cylinder head 6 and the cylinder block 7 has a water jacket 8 configured to flow cooling water therethrough.

The cooling water circuit includes the valve device 1 configured to control a flow quantity of cooling water. In the present embodiment, the valve device 1 is equipped to an intermediate position of an outlet passage 11 (FIG. 2), which is connected to a downstream of an outlet of the water jacket 8.

Figure 2:
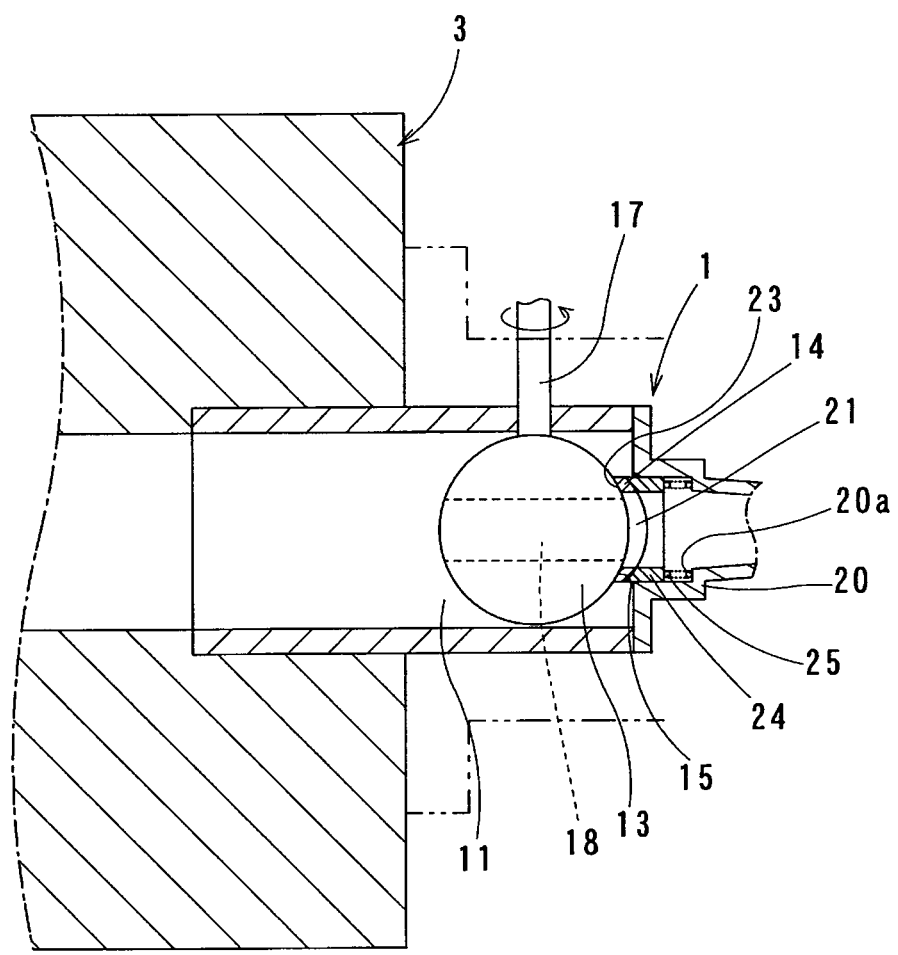
FIG. 2 is a schematic view showing a configuration of the valve device according to the first embodiment.
Figure 3:
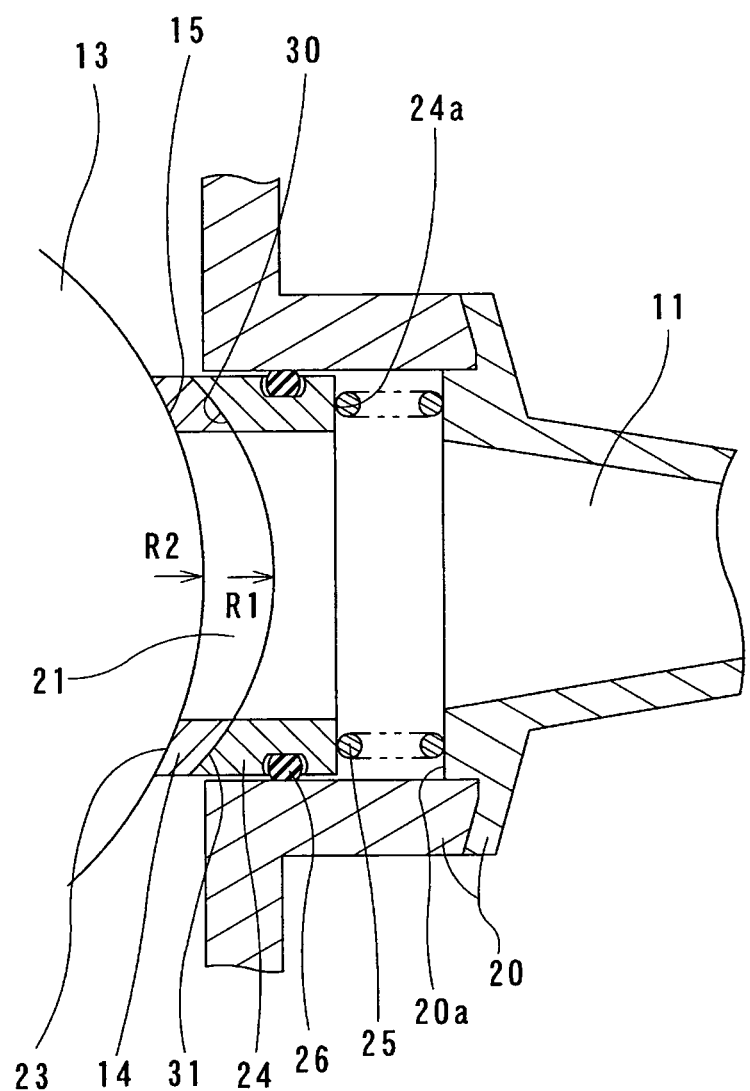
FIG. 3 is a sectional view showing the valve device according to the first embodiment.

Subsequently, the valve device 1 will be described with reference to FIGS. 2 and 3. The valve device 1 according to the present embodiment includes a ball valve 13 (rotative member) and a valve seat 14 (tubular member). The valve seat 14 is located on the downstream side of the ball valve 13.

The ball valve 13 is a valve element having a surface (first surface) 15, which is a part of a convex spherical surface. The ball valve 13 is fixed to one end of a shaft 17. The shaft 17 is rotatable around a predetermined rotation axis.

The ball valve 13 has a passage (internal passage, first passage) 18, which defines a flow direction different from the rotation axis. The ball valve 13 rotates thereby to change the direction of the internal passage 18.

The valve seat 14 is a tubular body formed of, for example, metal or resin. In the present embodiment, the valve seat 14 is formed of, for example, tetrafluoroethylene (PTFE), which has an excellent slidable characteristic. The valve seat 14 may be formed of a rubber material and may be further coated with PTFE. A pipe 20 is connected to the downstream side of the ball valve 13. The pipe 20 forms a cooling-water passage 11. The pipe 20 has an axial direction different from the axial direction of the rotation axis. The valve seat 14 is positioned to be substantially coaxial with the pipe 20.

The valve seat 14 forms a passage (valve seat side passage, second passage) 21 therein. The valve seat 14 and the pipe 20 form a part of the cooling-water passage 11. Rotation of the ball valve 13 enables to communicate the valve seat 14 with the internal passage 18 and to block the valve seat 14 from the internal passage 18.

The present configuration forms a valve configuration. In the valve configuration, rotation of the ball valve 13 enables to switch between a state, in which the internal passage 18 is blocked from the valve seat side passage 21 to close the cooling-water passage 11, and a state, in which the internal passage 18 is communicated with the valve seat side passage 21 to open the cooling-water passage 11.

The valve seat 14 has one end in the axial direction, and the one end defines an opening of the valve seat side passage 21. The opening of the valve seat 14 has a periphery defining a concave spherical surface (first spherical sealing surface) 23. The spherical sealing surface 23 has a curvature substantially the same as a curvature of the convex spherical surface 15 of the ball valve 13. The ball valve 13 is slidable and rotatable on the spherical sealing surface 23. The spherical sealing surface 23 is in surface contact with the surface 15 of the ball valve 13 by application of the predetermined biasing force. Thus, the present configuration forms a spherical surface seal structure between the valve seat 14 and the ball valve 13.

The predetermined biasing force is transmitted through a biasing force application member 24. The biasing force application member 24 according to the present embodiment is configured to be in contact with the valve seat 14 from the other end side of the valve seat 14 in the axial direction. Thus, the biasing force application member 24 is configured to transmit the biasing force from a spring 25 to the valve seat 14. According to the present embodiment, the spring 25 is a coil spring. It is noted that, the spring 25 may have various configuration such as a blade spring and/or a plate spring.

The biasing force application member 24 is a tubular body formed of, for example, metal or resin. The outer diameter and the inner diameter of the biasing force application member 24 is substantially equivalent to the outer diameter and the inner diameter of the valve seat 14, respectively. The interior of the biasing force application member 24 communicates with the interior of the pipe of the valve seat 14 to form a part of the cooling-water passage 11.

The biasing force application member 24 is inserted in the pipe 20. A seal member 26 is equipped between an inner circumferential periphery of the pipe 20 and an outer circumferential periphery of the biasing force application member 24. The seal member 26 forms a seal structure configured to avoid leakage of cooling water from the valve seat 14 and the outer circumferential periphery of the biasing force application member 24.

The one end side of the biasing force application member 24 in the axial direction has a contact surface (second surface) 30, which is in contact with the valve seat 14. The contact surface 30 is configured to be in contact with the valve seat 14 in the axial direction (rotation axis direction) of the rotation axis and slidable relative to the valve seat 14. In the present embodiment, the valve seat 14 has a contact surface 31, which is configured to be in contact with the biasing force application member 24. The contact surface 31 has a convex spherical surface. The contact surface 30 has a concave spherical surface, which has a curvature substantially the same as a curvature of the contact surface 31. The contact surface 30 is in surface contact with the contact surface 31. The contact surface 31 is slidable in the rotation axis direction relative to the contact surface 30 while being in surface contact entirely with the contact surface 30.

The spherical surfaces of the contact surface 31 and the contact surface 30 each has a curvature R1. The surface 15 of the ball valve 13 and the spherical sealing surface 23 each has a curvature R2. The curvature R1 is different from the curvature R2. The curvature R1 is, for example, smaller than the curvature R2.

The other end side of the biasing force application member 24 in the axial direction forms a receptacle seat 24a. The receptacle seat 24a receives the biasing force from the spring 25. The spring 25 has an end on the opposite side of the biasing force application member 24, and the end of the spring 25 is latched on a step portion 20a formed in the pipe 20.

(Operation Effect of Embodiment)

Figure 4:
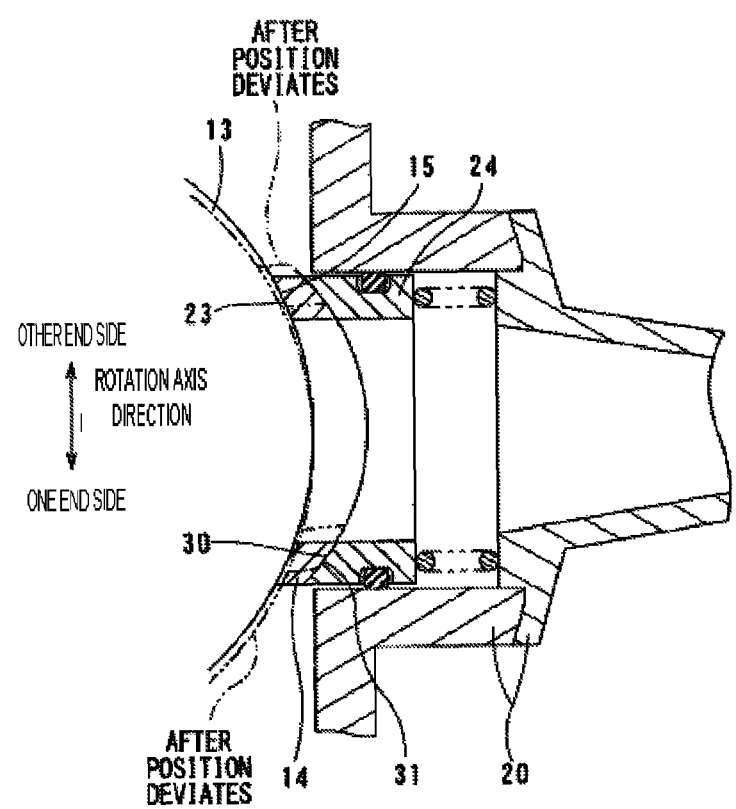
FIG. 4 is an explanatory view for explaining an operation effect of the valve device according to the first embodiment.

An operation effect of the present embodiment will be described with reference to FIG. 4. In the present embodiment, the valve seat 14 is slidable relative to the biasing force application member 24. For example, the valve seat 14 may be formed of a material having a low sliding resistance. In this case, the valve seat 14 is easily slidable relative to both the ball valve 13 and the biasing force application member 24. In the present configuration, when the position of the ball valve 13 deviates to one end side in the rotation axis direction toward the lower side in the drawing, the valve seat 14 slides between the ball valve 13 and the biasing force application member 24. Thus, the valve seat 14 moves to the other end side in the rotation axis direction toward the upper side in the drawing. That is, the spherical sealing surface 23 of the valve seat 14 slides on the surface 15 of the ball valve 13 while being entirely in contact with the surface 15. In addition, the contact surface 31 slides on the contact surface 30 while being entirely in contact with the contact surface 30.

In the present configuration, even when the position of the ball valve 13 deviates in the axial direction, the valve seat 14 is displaced along the surface 15 of the ball valve 13 in response to the deviation of the ball valve 13. Therefore, the present configuration enables to secure the seal between the valve seat 14 and the ball valve 13. In addition, the valve seat 14 is slidable relative to the biasing force application member 24. Therefore, even when the position of the ball valve 13 deviates in the rotation axis direction, the present deviation can be absorbed by the displacement of the valve seat 14. Consequently, the deviation is restricted from exerting influence to the biasing force application member 24. Thus, the biasing force application member 24 is restricted from being inclined relative to the axial direction of the pipe 20. As a result, even when the position of the ball valve 13 deviates, the valve seat 14 is restricted from being eccentrically applied with the biasing force. Thus, the present configuration enables to secure the sealing property between the ball valve 13 and the valve seat 14.

(Second Embodiment)

Figure 5:
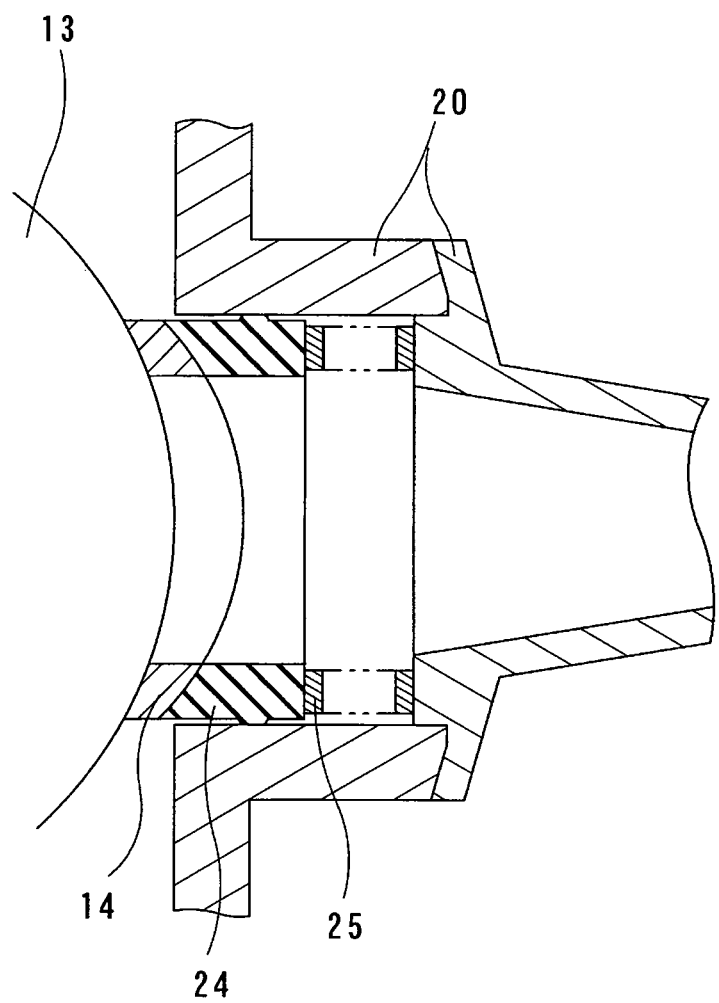
FIG. 5 is a sectional view showing a valve device according to a second embodiment.

The valve device 1 according to the second embodiment will be described with reference to FIG. 5. In the following description, difference from the first embodiment will be mainly described. The same notations as those in the first embodiment may represent the same configurations and may refer to the above description. In the present embodiment, the biasing force application member 24 is formed of a rubber material. In addition, a part of the biasing force application member 24 is in pressure contact with the inner circumferential periphery of the pipe 20 to function as a seal to avoid leakage of cooling water from the valve seat 14 and the outer circumferential periphery of the biasing force application member 24.

The present configuration enables to omit the seal member 26 provided in the first embodiment. Therefore, the present configuration enables to reduce components and an assemble process. Therefore, the present configuration reduces a manufacturing cost. It is noted that, in the configuration in which the biasing force application member 24 is formed of a rubber material, the biasing force application member 24 may deform due to application of the biasing force from the spring 25. In consideration of this, in the present embodiment, the spring 25 is a coil spring formed of a flat wire having a rectangular cross section. The present configuration enables to cause the spring 25 to be in surface contact with the biasing force application member 24 thereby to restrict deformation of the biasing force application member 24.

(Third Embodiment)

Figure 6:
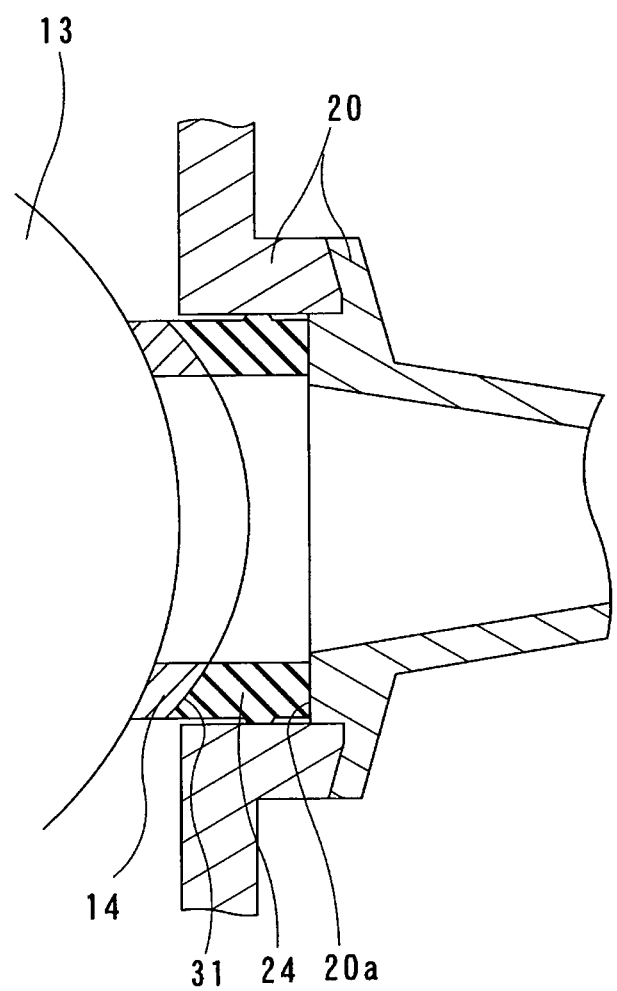
FIG. 6 is a sectional view showing a valve device according to a third embodiment.

The valve device 1 according to the third embodiment will be described with reference to FIG. 6. In the following description, difference from the second embodiment will be mainly described. The same notations as those in the second embodiment may represent the same configurations and may refer to the above description. In the present embodiment, the biasing force application member 24 is formed of a rubber material. Thus, the biasing force application member 24 produces the biasing force itself. In the present configuration, the biasing force application member 24 may be assembled between the step portion 20a and the contact surface 31, while being compressed. Thus, the biasing force application member 24 produces a restoring force to depress the valve seat 14 to the ball valve 13.

The present configuration enables to omit the spring 25 provided in the first embodiment. Therefore, the present configuration enables to reduce components and an assemble process. Therefore, the present configuration reduces a manufacturing cost.

(Fourth Embodiment)

Figure 7:
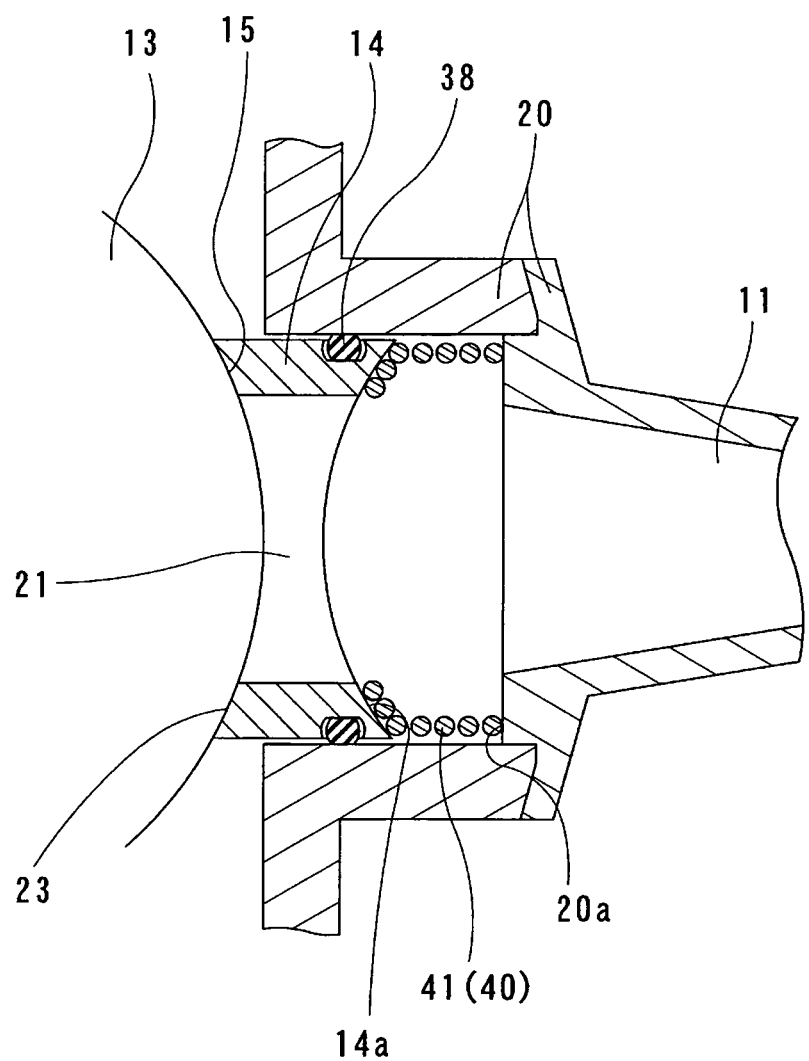
FIG. 7 is a sectional view showing a valve device according to a fourth embodiment.

The valve device 1 according to the fourth embodiment will be described with reference to FIGS. 7 and 8. In the following description, difference from the first embodiment will be mainly described. The same notations as those in the first embodiment may represent the same configurations and may refer to the above description. In the present embodiment, the valve seat 14 is inserted in the pipe 20. In addition, a seal member 38 is equipped between the outer circumferential periphery of the valve seat 14 and the inner circumferential periphery of the pipe 20.

The valve device 1 includes a biasing force application member 40. The biasing force application member 40 is in contact with the valve seat 14 from the other end side of the valve seat 14 in the axial direction. The biasing force application member 40 applies a biasing force to depress the valve seat 14 toward the ball valve 13. In the present embodiment, the biasing force application member 40 is a coil spring 41. The biasing force application member 40 of the present embodiment may be in common with the biasing force application member 24 of the first embodiment in the function to depress the valve seat 14 toward the ball valve 13. It is noted that, the biasing force application member 40 may be different from the biasing force application member 24 in the function whether to slide proactively relative to the valve seat 14. Therefore, the different notation is provided to the biasing force application member 40.

The valve seat 14 has a biasing force receiving surface 14a on the other end in the axial direction. The biasing force receiving surface 14a is a concave spherical surface (second concave spherical surface). The biasing force receiving surface 14a is in contact with the biasing force application member 40 to receive the biasing force from the biasing force application member 40. The coil spring 41 has an end on the opposite side of the valve seat 14, and the end is latched on the step portion 20a, which is formed in the pipe 20.

The coil spring 41 is wound to have a side, at which the coil spring 41 is in contact with the valve seat 14, and the side has an outline substantially in a spherical shape, which is substantially in parallel with the shape of the biasing force receiving surface 14a. On this side, a coil wire of the coil spring 41 is arranged in the radial direction of the biasing force receiving surface 14a and is in contact with the biasing force receiving surface 14a.

(Operation Effect of Present Embodiment)

Figure 8:
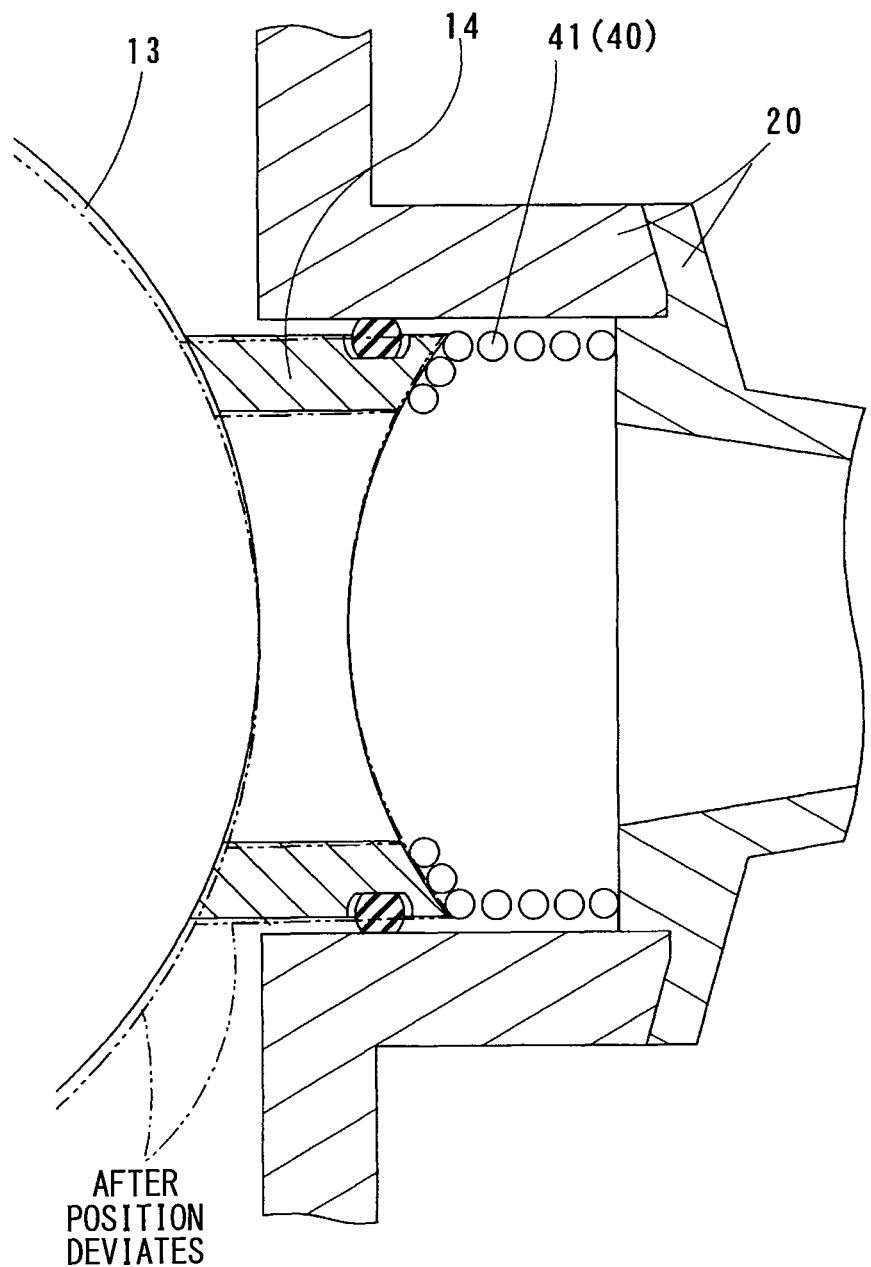
FIG. 8 is an explanatory view for explaining an operation effect of the valve device according to the fourth embodiment.

Dissimilarly to the first embodiment, in the present embodiment, as shown in FIG. 8, when the position of the ball valve 13 deviates in the rotation axis direction, the valve seat 14 may incline within the pipe 20 relative to the axial direction of the pipe 20. Nevertheless, it is noted that, the biasing force receiving surface 14a, which receives the biasing force from the coil spring 41, is the concave spherical surface. Therefore, the present configuration restricts deviation in the position of the biasing force receiving surface 14a caused by inclination of the valve seat 14.

In addition, even when the position of the biasing force receiving surface 14a deviates, the coil spring 41, which has the contact portion having the spherical outline, follows the deviation in the position of the biasing force receiving surface 14a. Therefore, the valve seat 14 is restricted from being eccentrically applied with the biasing force.

(Fifth Embodiment)

Figure 9:
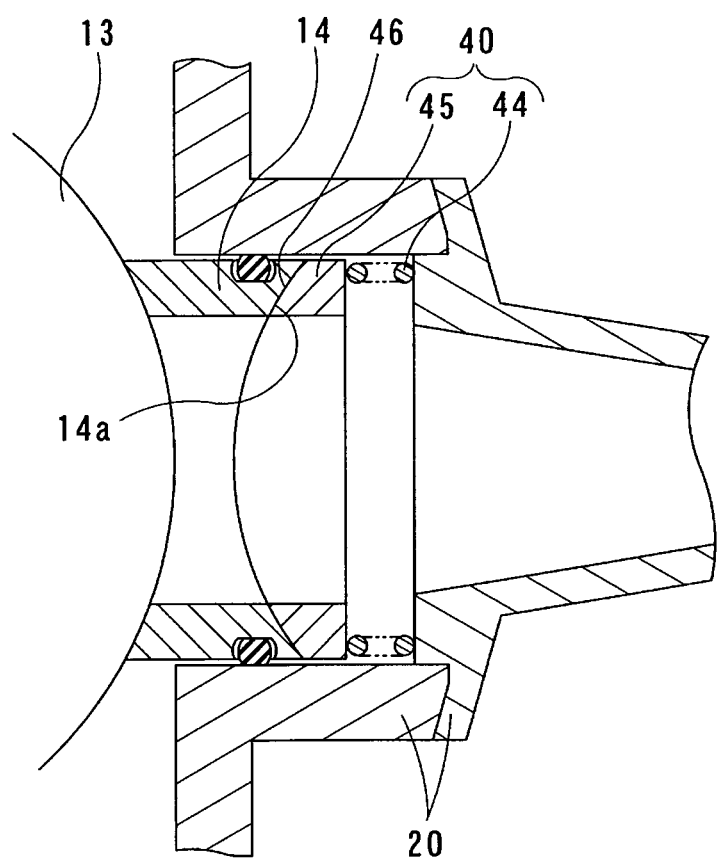
FIG. 9 is a sectional view showing a valve device according to a fifth embodiment.

The valve device 1 according to the fifth embodiment will be described with reference to FIG. 9. In the following description, difference from the first embodiment will be mainly described. The same notations as those in the fourth embodiment may represent the same configurations and may refer to the above description. The biasing force application member 24 according to the present embodiment includes the coil spring 41 and a tubular member 45. The coil spring 41 is substantially in a tubular shape. The tubular member 45 is equipped to the other end of the coil spring 41 in the axial direction. The tubular member 45 transmits a biasing force from the coil spring 41 to the valve seat 14.

A contact surface 46 of the tubular member 45 is in contact with the valve seat 14. The contact surface 46 is in a convex spherical shape, which is configured to be entirely in contact with the biasing force receiving surface 14a. In the present embodiment, similarly to the fourth embodiment, even when the position of the ball valve 13 deviates in the rotation axis direction to deviate the position of the biasing force receiving surface 14a, the valve seat 14 is restricted from being eccentrically applied with the biasing force.

(Sixth Embodiment)

Figure 10:
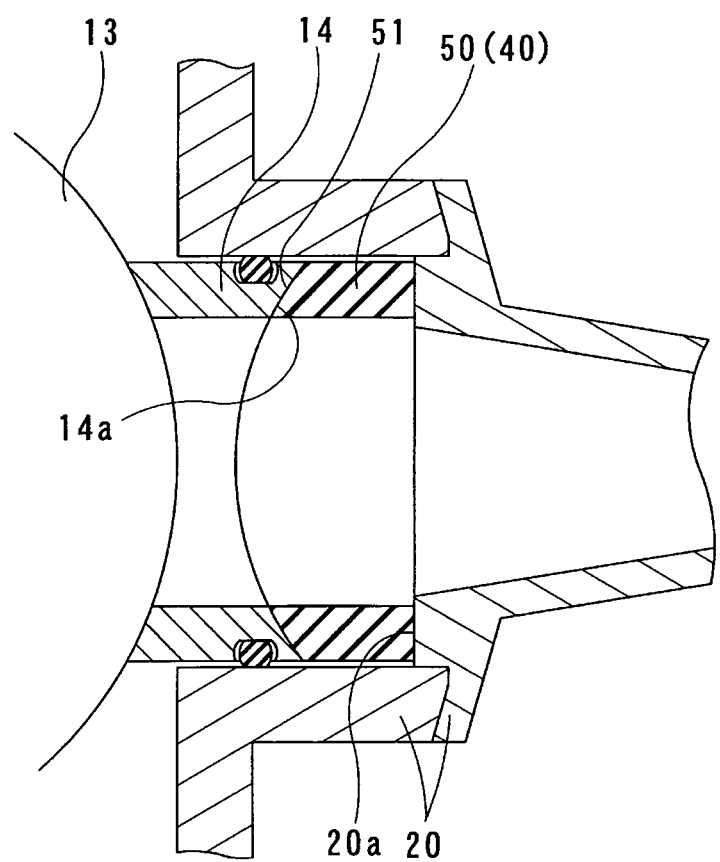
FIG. 10 is a sectional view showing a valve device according to a sixth embodiment.

The valve device 1 according to the sixth embodiment will be described with reference to FIG. 10. In the following description, difference from the first embodiment will be mainly described. The same notations as those in the fourth embodiment may represent the same configurations and may refer to the above description. The biasing force application member 24 according to the present embodiment is a tubular member 50, which is formed of a rubber material. The tubular member 50 is equipped between the step portion 20a and the biasing force receiving surface 14a, while being compressed. In the present configuration, the tubular member 50 produces a restoring force to depress the valve seat 14 to the ball valve 13.

The tubular member 50 has a contact surface 51, which is in contact with the valve seat 14. The contact surface 51 is substantially in a convex spherical shape and is configured to be in contact entirely with the biasing force receiving surface 14a. In the present embodiment, similarly to the fourth embodiment, even when the position of the ball valve 13 deviates in the rotation axis direction to deviate the position of the biasing force receiving surface 14a, the valve seat 14 is restricted from being eccentrically applied with the biasing force.

(Modification)

In the first embodiment, the contact surface 31 is in the convex spherical shape, and the contact surface 30 is in the concave spherical shape. It is noted that, the contact surface 31 may be in a concave spherical shape, and the contact surface 30 may be in a convex spherical shape. Each of the contact surface 31 and the contact surface 30 may be in a flat shape.

In the first embodiment, when the position of the ball valve 13 deviates in the rotation axis direction, the valve seat 14 slides relative to both the ball valve 13 and the biasing force application member 24. It is noted that, for example, a frictional resistance between the valve seat 14 and the ball valve 13 in the rotation axis direction may be set to be high, such that the valve seat 14 can be displaced together with the ball valve 13, in response to displacement of the ball valve 13 in the rotation axis direction. In the present configuration, sliding arises only between the valve seat 14 and the biasing force application member 24.

In the first embodiment, the curvature R1 is different from the curvature R2. It is noted that, the curvature R2 may be the same as the curvature R1.

The valve device according to the present disclosure includes the rotative member, the tubular member, the spherical surface seal structure, and the biasing force application member. The rotative member has the passage (inner passage) and the surface, the surface being a part of the convex spherical surface. The rotative member is rotatable around the predetermined rotation axis to change the direction of the passage. The tubular member is the tubular body having the axial direction, which is different from the direction of the rotation axis. The tubular member has the passage therein. The passage is configured to be communicated with the inner passage and to be blocked from the inner passage with rotation of the rotative member. The spherical surface seal structure is located on the one end side of the tubular member in the axial direction and is located around the opening periphery of the passage. The spherical surface seal structure has the concave spherical surface on which the rotative member is rotatable and slidable. The spherical surface seal structure forms the seal between the tubular member and the rotative member when the concave spherical surface is in pressure contact with the surface of the rotative member on application of the predetermined biasing force. The biasing force application member is configured to produce the biasing force itself or to transmit the biasing force from another object to the tubular member to apply the biasing force to the tubular member. The biasing force application member is in contact with the tubular member from the other end side of the tubular member in the axial direction. The biasing force application member has the surface, which is in contact with the tubular member, the surface being slidable relative to the tubular member.

In the present configuration, the tubular member, on which the rotative member is rotatable and slidable, is slidable relative to the biasing force application member. Therefore, even when the rotative member is displaced in the axial direction of the rotation axis, the rotative member is slidable relative to the biasing force application member, while the tubular member absorbs the deviation of the rotative member. Therefore, even when the rotative member is displaced in the axial direction of the rotation axis, inclination of the biasing force application member can be restricted, with small influence caused by the displacement and imposed on the biasing force application member. As a result, even when the position of the ball valve deviates, the tubular member can be restricted from eccentric application of the biasing force. Thus, the present configuration enables to secure the seal performance between the ball valve and the valve seat sufficiently.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A valve device comprising:
    a rotative member having a first passage and a first surface, the first surface being a part of a convex spherical surface, the rotative member being rotatable around a predetermined rotation axis to change a direction of the first passage;
    a tubular member being a tubular body having an axial direction, which is different from a rotation axis direction of the rotation axis, the tubular member having a second passage therein, the second passage configured to be communicated with the first passage of the rotative member and to be blocked from the first passage according to rotation of the rotative member;
    a spherical surface seal structure located at one end side of the tubular member in the axial direction and located around an opening periphery of the second passage of the tubular member, the spherical surface seal structure having a first concave spherical surface, on which the rotative member is rotatable and slidable, the spherical surface seal structure forming a seal between the tubular member and the rotative member when the first concave spherical surface is applied with a biasing force and is in pressure contact with the first surface of the rotative member; and
    a biasing force application member configured to apply the biasing force to the tubular member by producing the biasing force itself or by transmitting the biasing force from an other object to the tubular member, wherein
    the biasing force application member has a second surface, which is in contact with the tubular member from an other end side of the tubular member in the axial direction,
    the second surface is slidable relative to the tubular member,
    the tubular member is slidable between the rotative member and the biasing force application member,
    the tubular member is movable in the rotation axis direction relative to the biasing force application member,
    the second surface of the biasing force application member is a concave spherical surface,
    the tubular member has a contact surface being a convex spherical surface, and
    the tubular member is slidable in the rotation axis direction relative to the biasing force application member.

2. The valve device according to claim 1, wherein the biasing force application member is formed of a rubber material.

3. The valve device according to claim 1, wherein when a position of the rotative member deviates to one end side in the rotation axis direction, the tubular member is movable to an other end side in the rotation axis direction.

4. The valve device according to claim 1, wherein each of the second surface and the contact surface has a first curvature, the first surface of the rotative member has a second curvature, and the first curvature is less than the second curvature.

5. The valve device according to claim 1, wherein
    the tubular member is a singular component, and
    the first concave spherical surface and the second surface are concave and are recessed in the same direction toward the biasing force application member.

6. The valve device according to claim 5, wherein
    the tubular member is slidable relative to the biasing force application member while maintaining a shape of the tubular member and while securing a sealing property between the rotative member and the tubular member.

7. The valve device according to claim 1, further comprising:
    a shaft in a bar shape and fixed to the rotative member, wherein
    the shaft linearly extends through a wall of a third passage, the third passage configured to communicate with the second passage through the first passage according to rotation of the rotative member,
    the shaft is rotatably supported by the wall and is configured to rotate centered on the rotation axis, and
    the shaft is movable in the rotation axis direction relative to the wall.

8. The valve device according to claim 1, wherein
    the biasing force application member is configured to apply the biasing force to the tubular member in a direction perpendicular to the rotation axis direction.

9. The valve device according to claim 1, wherein
    the rotation axis extends linearly in the rotation axis direction,
    the first passage extends perpendicularly to the rotation axis direction, and
    the rotative member is movable linearly along the rotation axis direction.

10. The valve device according to claim 1, wherein the rotative member is configured to be deviated in the rotation axis direction due to at least one of a variation in a component dimension, deformation caused in the rotative member when applied with a pressure, and deformation caused in the rotation axis.

11. A valve device comprising:
    a rotative member having a first passage and a first surface, the first surface being a part of a convex spherical surface, the rotative member being rotatable around a predetermined rotation axis to change a direction of the first passage, the rotation axis extending linearly in a rotation axis direction of the rotation axis;

a shaft in a bar shape and fixed to the rotative member, the shaft linearly extending through a wall of a third passage, which is configured to communicate with the second passage through the first passage according to rotation of the rotative member, the shaft being rotatably supported by the wall and is configured to rotate centered on the rotation axis, the shaft being movable together with the rotative member linearly in the rotation axis direction relative to the wall;

a tubular member being a tubular body having an axial direction, which is different from the rotation axis direction, the tubular member having a second passage configured to be communicated with the first passage and to be blocked from the first passage according to rotation of the rotative member;

a spherical surface seal structure located at one end side of the tubular member in the axial direction and located around an opening periphery of the second passage of the tubular member, the spherical surface seal structure having a first concave spherical surface, on which the rotative member is rotatable and slidable, the spherical surface seal structure forming a seal between the tubular member and the rotative member; and a biasing force application member configured to apply the biasing force to the tubular member in a direction perpendicular to the rotation axis direction, wherein the biasing force application member has a second surface, which is a concave spherical surface slidable relative to the tubular member from an other end side of the tubular member in the axial direction, the tubular member has a contact surface being a convex spherical surface and slidable relative to the biasing force application member, the tubular member is movable and is slidable in the rotation axis direction relative to the biasing force application member while securing a sealing property between the rotative member and the tubular member, and the first concave spherical surface and the second surface are concave and are recessed in the same direction toward the biasing force application member.

12. The valve device according to claim 11, wherein
the tubular member is monolithic and is a singular component, and
the tubular member is slidable relative to the biasing force application member while maintaining a shape of the tubular member.

13. A valve device comprising:
a rotative member having a first passage and a first surface, the first surface being a part of a convex spherical surface, the rotative member being rotatable around a predetermined rotation axis to change a direction of the first passage;

a tubular member being a tubular body having an axial direction, which is different from a rotation axis direction of the rotation axis, the tubular member having a second passage therein, the second passage configured to be communicated with the first passage of the rotative member and to be blocked from the first passage according to rotation of the rotative member;

a spherical surface seal structure located at one end side of the tubular member in the axial direction and located around an opening periphery of the second passage of the tubular member, the spherical surface seal structure having a first concave spherical surface, on which the rotative member is rotatable and slidable, the spherical surface seal structure forming a seal between the tubular member and the rotative member when the first concave spherical surface is applied with a biasing force and is in pressure contact with the first surface of the rotative member; and a biasing force application member configured to apply the biasing force to the tubular member by producing the biasing force itself or by transmitting the biasing force from an other object to the tubular member, wherein the biasing force application member has a second surface, which is in contact with the tubular member from an other end side of the tubular member in the axial direction, the second surface is slidable relative to the tubular member, the tubular member is slidable between the rotative member and the biasing force application member, the tubular member is movable in the rotation axis direction relative to the biasing force application member, the second surface of the biasing force application member is a concave spherical surface, the tubular member has a contact surface being a convex spherical surface, and the tubular member is movable and is slidable in the rotation axis direction relative to the biasing force application member while securing a sealing property between the rotative member and the tubular member.

14. The valve device according to claim 13, wherein
the tubular member is movable and is slidable in the rotation axis direction relative to the biasing force application member while maintaining a shape of the tubular member, and
the tubular member is a singular component.

15. The valve device according to claim 14, wherein
the first concave spherical surface and the second surface are concave and are recessed in the same direction toward the biasing force application member.

* * * * *